(12) United States Patent
Hirokawa

(10) Patent No.: US 10,889,316 B2
(45) Date of Patent: Jan. 12, 2021

(54) RACK-AND-PINION STEERING APPARATUS AND METHOD OF MANUFACTURING THE SAME

(71) Applicant: JTEKT CORPORATION, Osaka (JP)

(72) Inventor: Yoshinori Hirokawa, Yokohama (JP)

(73) Assignee: JTEKT CORPORATION, Osaka (JP)

( * ) Notice: Subject to any disclaimer, the term of this patent is extended or adjusted under 35 U.S.C. 154(b) by 135 days.

(21) Appl. No.: 16/119,147

(22) Filed: Aug. 31, 2018

(65) Prior Publication Data

US 2019/0071114 A1  Mar. 7, 2019

(30) Foreign Application Priority Data

Sep. 7, 2017  (JP) .................................. 2017-172403

(51) Int. Cl.
*B62D 3/12* (2006.01)
*F16H 57/023* (2012.01)
*F16H 19/04* (2006.01)

(52) U.S. Cl.
CPC ............... *B62D 3/126* (2013.01); *B62D 3/12* (2013.01); *F16H 19/04* (2013.01); *F16H 57/023* (2013.01)

(58) Field of Classification Search
CPC ........... B62D 3/126; B62D 3/12; F16H 19/04; F16H 57/023
See application file for complete search history.

(56) References Cited

U.S. PATENT DOCUMENTS

| | | | |
|---|---|---|---|
| 4,475,413 A | 10/1984 | Higuchi | |
| 8,708,357 B2 * | 4/2014 | Sumihara | B62D 3/12 280/93.514 |
| 9,744,985 B2 * | 8/2017 | Ryu | F16H 55/26 |
| 10,352,429 B2 * | 7/2019 | Hagiwara | B21K 1/767 |
| 10,392,046 B2 * | 8/2019 | Mizushima | B21K 1/767 |
| 2002/0063012 A1 * | 5/2002 | Katou | B62D 3/12 180/427 |
| 2007/0113698 A1 * | 5/2007 | Ohta | C22C 38/04 74/422 |
| 2007/0175288 A1 * | 8/2007 | Takei | B62D 3/12 74/434 |

(Continued)

FOREIGN PATENT DOCUMENTS

| | | |
|---|---|---|
| EP | 3281843 A1 | 2/2018 |
| JP | 2012-081867 A | 4/2012 |
| JP | 2012-126335 A | 7/2012 |

OTHER PUBLICATIONS

Feb. 13, 2019 Extended Search Report issued in European Patent Application No. 18192745.0.

*Primary Examiner* — Zakaria Elahmadi

(74) *Attorney, Agent, or Firm* — Oliff PLC

(57) ABSTRACT

A steering gear apparatus includes a rack shaft, a pinion shaft, and a housing. The rack shaft has rack teeth and moves in an axial direction to steer front wheels. The pinion shaft has pinion teeth and rotates in accordance with steering operation of a steering wheel. The housing supports the rack shaft and the pinion shaft, and houses a meshing area between the rack teeth and the pinion teeth. When the steering wheel is in its neutral position, the pinion teeth mesh with the rack teeth at a rotational position of the pinion shaft that minimizes torque required to move the rack shaft in the axial direction during one rotation of the pinion shaft.

7 Claims, 8 Drawing Sheets

(56) References Cited

U.S. PATENT DOCUMENTS

| | | | |
|---|---|---|---|
| 2011/0204588 A1* | 8/2011 | Yang | B62D 3/126 |
| | | | 280/93.514 |
| 2017/0050666 A1* | 2/2017 | Kawakubo | F16H 55/28 |
| 2017/0113718 A1* | 4/2017 | Ohashi | B62D 3/12 |
| 2017/0113719 A1* | 4/2017 | Ohashi | B62D 3/12 |
| 2018/0215412 A1* | 8/2018 | Christiansen | B62D 5/04 |
| 2019/0185049 A1* | 6/2019 | Nemeth | B62D 3/126 |

* cited by examiner

COMPARISON EXAMPLE

RACK-AND-PINION STEERING APPARATUS AND METHOD OF MANUFACTURING THE SAME

INCORPORATION BY REFERENCE

The disclosure of Japanese Patent Application No. 2017-172403 filed on September 7 including the specification, drawings and abstract, is incorporated herein by reference in its entirety.

BACKGROUND OF THE INVENTION

1. Field of the Invention

The invention relates to a rack-and-pinion steering apparatus and a method of manufacturing the rack-and-pinion steering apparatus.

2. Description of Related Art

A rack-and-pinion steering apparatus for steering steered wheels of a vehicle includes a pinion shaft and a rack shaft. The pinion shaft rotates in accordance with steering operation of a steering wheel. The rack shaft meshes with the pinion shaft and reciprocates in the lateral direction of the vehicle. Each end of the rack shaft is coupled to a corresponding one of right and left steered wheels via a ball joint and a tie rod. The reciprocating motion of the rack shaft steers the steered wheels.

It is known that a steering feel provided by such a rack-and-pinion steering apparatus depends highly on the magnitude of a steering force required to start the steering operation when a steering wheel is in its neutral position. Specifically, if a large force is required to start turning the steering wheel that is in the neutral position, a driver feels a drag or resistance. This degrades a steering feel. The applicant of this application has already disclosed electric power steering systems for reducing a drag feel that is caused when steering operation is started (refer to Japanese Patent Application Publication No. 2012-81867 (JP 2012-81867 A) and Japanese Patent Application Publication No. 2012-126335 (JP 2012-126335 A)).

In the electric power steering system disclosed in JP 2012-81867 A, an elastic member is disposed between a guide portion and a base portion of a support yoke of a rack guide mechanism that presses a rack shaft against a pinion shaft. The elastic member helps to reduce a drag feel that is caused when steering operation is started. On the other hand, the electric power steering system disclosed in JP 2012-126335 A includes a worm shaft and a worm wheel. The worm shaft rotates by torque of an electric motor. The worm wheel meshes with the worm shaft and rotates together with a steering shaft. In a dead zone where the electric motor does not produce torque because steering torque is very small, a bearing that supports the worm shaft is moved in an axial direction by an actuator, such as a piezoelectric element. Thus, the worm shaft moves in the axial direction to assist steering operation.

Unfortunately, in some products, the approaches described above may still leave some drag feel at the start of steering operation. Through extensive research, the inventor of this application discovers that a curved distortion of a pinion shaft that is caused by application of heat treatment to the pinion shaft is a contributing factor to a drag feel that is caused when steering operation is started. Countermeasures against this may include adding a process of correcting a curved distortion of a pinion shaft and adding a process of finishing pinion teeth of a pinion shaft by skiving or the like after heat treatment of the pinion shaft. However, such additional processes necessitate extensive machinery and more processing time, thus leading to a significant increase in manufacturing cost of a pinion shaft.

The inventor of this application invents a structure that reduces a drag feel at the start of steering operation even when a pinion shaft is curved.

SUMMARY OF THE INVENTION

A propose of the invention is to provide a rack-and-pinion steering apparatus and a method of manufacturing the rack-and-pinion steering apparatus for reducing a drag feel at the start of steering operation so as to improve steering feel, while curbing an increase in manufacturing cost.

An aspect of the invention provides a rack-and-pinion steering apparatus including a rack shaft, a pinion shaft, and a housing. The rack shaft has rack teeth and is configured to move in an axial direction to steer steered wheels of a vehicle. The pinion shaft has pinion teeth and is configured to rotate in accordance with steering operation of a steering wheel. The housing supports the rack shaft and the pinion shaft, and houses a meshing area between the rack teeth and the pinion teeth. When the steering wheel is in its neutral position, the pinion teeth mesh with the rack teeth at a rotational position of the pinion shaft that minimizes torque required to move the rack shaft in the axial direction during one rotation of the pinion shaft.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention is described with reference to FIG. 1 through FIG. 7. While the invention will be described in conjunction with a specific embodiment that illustrates various preferred technical features, it is to be understood that the embodiment is not intended to limit the invention.

Figure 1:
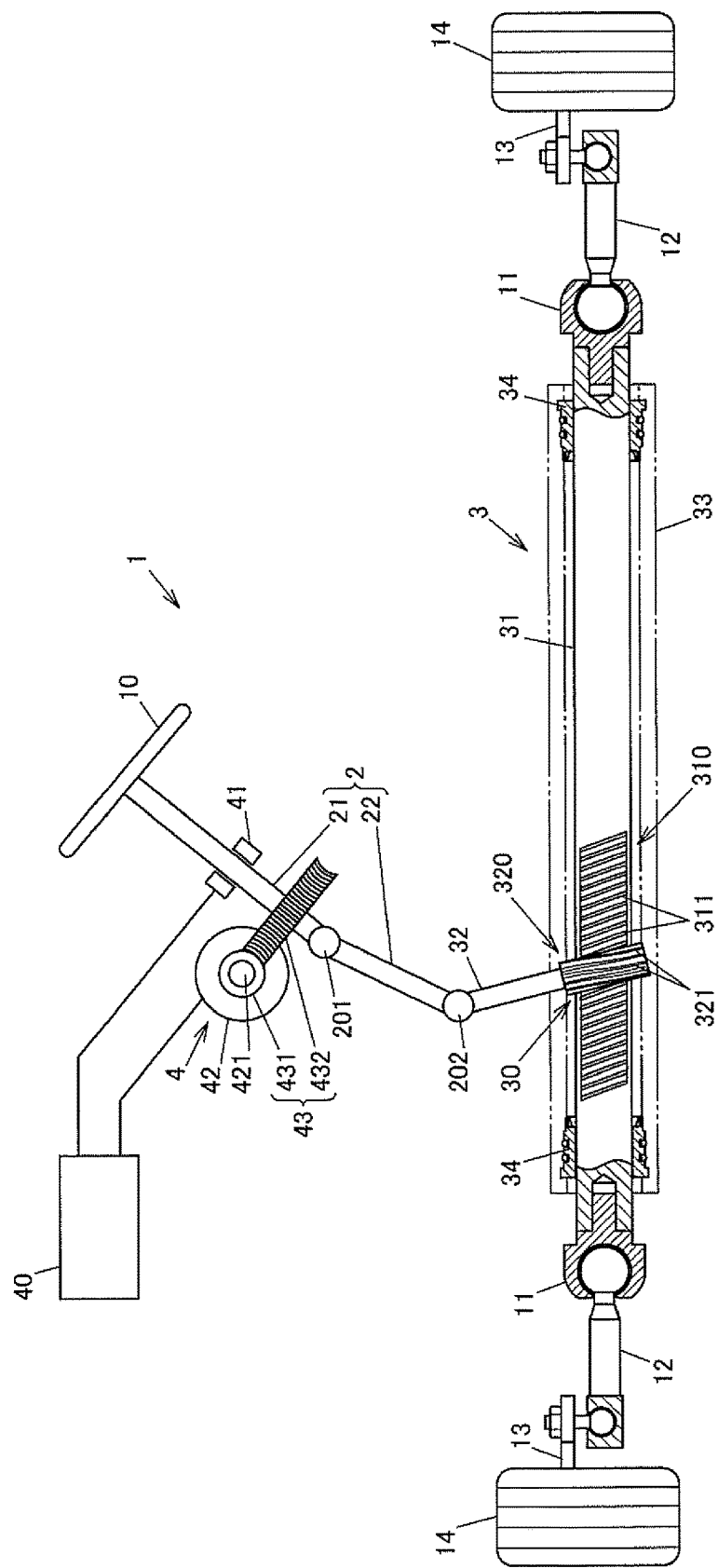
FIG. 1 is a diagram illustrating an example of the structure of an electric power steering system according to an embodiment of the invention.

FIG. 1 is a diagram schematically illustrating an example of the structure of an electric power steering system 1 according to an embodiment of the invention.

The electric power steering system 1 includes a steering wheel 10, a steering shaft 2, a rack shaft 31, a pinion shaft 32, a housing 33, and a steering assist device 4. The steering wheel 10 is operated by a driver to perform steering operation that steers a vehicle. The steering shaft 2 is coupled at one end to the steering wheel 10. The rack shaft 31 is configured to move in its axial direction. The axial movement of the rack shaft 31 steers a pair of right and left front wheels 14. The pinion shaft 32 is coupled to the steering shaft 2 and meshes with the rack shaft 31. The housing 33 houses part of the rack shaft 31 and part of the pinion shaft 32. The steering assist device 4 assists a driver in performing the steering operation. The housing 33 has a tubular portion that houses the rack shaft 31. Inside the housing 33, a pair of rack bushes 34 made of resin are each provided at a different end of the tubular portion. The rack shaft 31 is supported with respect to the housing 33 by the pair of rack bushes 34. The rack shaft 31, the pinion shaft 32, the housing 33, and the pair of rack bushes 34 form a steering gear apparatus 3 that serves as a rack-and-pinion steering apparatus. In FIG. 1, the housing 33 is represented by a hidden outline (a long dashed double-short dashed line) and the inside of the housing 33 is illustrated.

The steering shaft 2 includes a column shaft 21 and an intermediate shaft 22. One end of the column shaft 21 is fixed to the steering wheel 10. The intermediate shaft 22 is coupled to the column shaft 21 by a first universal joint 201. The pinion shaft 32 is coupled to the intermediate shaft 22 by a second universal joint 202. The steering shaft 2 transmits, to the pinion shaft 32, steering torque applied to the steering wheel 10. The pinion shaft 32 has a central axis along its longitudinal direction and rotates about the central axis in accordance with the steering operation of the steering wheel 10.

The pinion shaft 32 has a pinion-teeth section 320 provided with multiple pinion teeth 321. The pinion-teeth section 320 is located close to one end of the pinion shaft 32 opposite to the end coupled to the intermediate shaft 22. The pinion teeth 321 are helical teeth with tooth traces inclined with respect to the direction of the central axis of the pinion shaft 32. The rack shaft 31 has a rack-teeth section 310 provided with multiple rack teeth 311 that mesh with the pinion teeth 321. The rotation of the pinion shaft 32 causes the rack shaft 31 to move in the axial direction that is along the lateral direction of the vehicle. The pinion-teeth section 320 of the pinion shaft 32 and the rack teeth section 310 of the rack shaft 31 mesh with each other inside the housing 33.

One ball joint socket 11 is fixed to each end of the rack shaft 31. Tie rods 12 separately coupled to the ball joint sockets 11 are coupled to the front wheels 14 through knuckle arms 13. Thus, the axial movement of the rack shaft 31 caused by the rotation of the pinion shaft 32 steers the front wheels 14 as steered wheels.

The steering assist device 4 includes a torque sensor 41, an electric motor 42, and a speed-reduction mechanism 43. The torque sensor 41 detects steering torque applied by a driver to the steering wheel 10. The speed-reduction mechanism 43 decelerates a rotational force of an output shaft 421 of the electric motor 42 and transmits the decelerated rotational force to the column shaft 21. The speed-reduction mechanism 43 includes a worm 431 and a worm wheel 432 that are in mesh with each other. The worm 431 rotates together with the output shaft 421 of the electric motor 42. The worm wheel 432 rotates together with the column shaft 21. The electric motor 42 is supplied with motor current from a controller 40. The controller 40 controls the electric motor 42 on the basis of the steering torque detected by the torque sensor 41 and a vehicle speed. The rotational force of the output shaft 421 of the electric motor 42, after being decelerated by the speed-reduction mechanism 43, is applied as a steering assist force to the column shaft 21.

Figure 2:
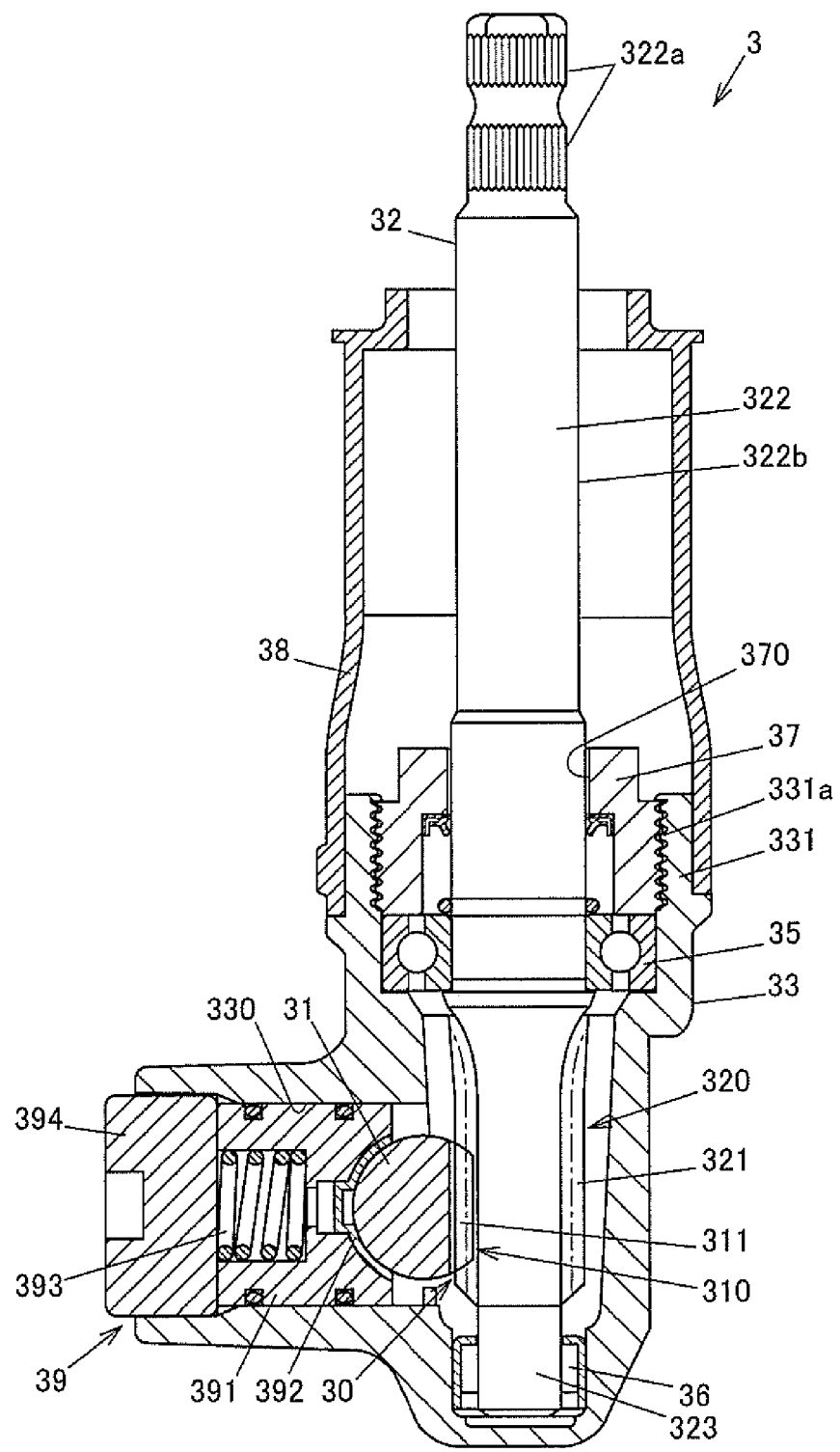
FIG. 2 is a partial cross-sectional view of a steering gear apparatus.

FIG. 2 is a partial cross-sectional view of the steering gear apparatus 3. The bottom of FIG. 2 corresponds to the bottom of the steering gear apparatus 3 in a vertical direction when the steering gear apparatus 3 is mounted on a vehicle.

The pinion-teeth section 320 is formed in the lower half of the pinion shaft 32 in the axial direction of the pinion shaft 32. Specifically, the pinion shaft 32 has first and second ends that are opposite to each other in the axial direction of the pinion shaft 32 and that respectively correspond to lower and upper ends. The pinion-teeth section 320 is located closer to the first end than to the second end. The pinion shaft 32 has a cylindrical shank section 322 between the pinion-teeth section 320 and the second end. A serration portion 322a fittable to the second universal joint 202 (refer to FIG. 1) is formed at one end (an upper end) of the shank section 322 farther from the pinion-teeth section 320. A solid cylindrical boss section 323 is formed at the first end (the lower end) of the pinion shaft 32 (i.e., at the end closer to the pinion-teeth section 320). The boss section 323 extends from the pinion-teeth section 320 in a direction away from the shank section 322.

The pinion shaft 32 is rotatably supported with respect to the housing 33 by first and second bearings 35 and 36 mounted in the housing 33. The first bearing 35 is a ball bearing and supports the shank section 322 of the pinion shaft 32. The second bearing 36 is a needle roller bearing and supports the boss section 323 of the pinion shaft 32.

The housing 33 has a hollow cylindrical portion 331. The shank section 322 of the pinion shaft 32 is inserted through the cylindrical portion 331 and protrudes from the top of the cylindrical portion 331. An internal thread 331a is formed on the inner surface of the cylindrical portion 331 and threadedly engages with a lid member 37. The shank section 322 of the pinion shaft 32 is inserted through an insertion hole 370 formed in the lid member 37. A cover member 38 made of resin fits on the outer peripheral surface of the cylindrical portion 331. The cover member 38 extends to near the serration portion 322a to cover an outer peripheral surface 322b of the shank section 322 of the pinion shaft 32.

The housing 33 houses a meshing area 30 between the rack teeth 311 and the pinion teeth 321. The housing 33 houses a rack guide mechanism 39 that presses the rack shaft 31 against the pinion shaft 32 to reduce gear rattling noise produced in the meshing area 30. The rack guide mechanism 39 includes a support yoke 391, a sheet member 392, a coil spring 393, and a plug 394. The support yoke 391 is held in an accommodation hole 330 of the housing 33 and is reciprocatable within the accommodation hole 330. The sheet member 392 is made of resin and is located between the support yoke 391 and the back of the rack shaft 31. The coil spring 393 biases the support yoke 391 toward the rack shaft 31. The plug 394 seals an opening of the accommodation hole 330.

The first and second bearings 35 and 36, the lid member 37, the cover member 38, and the rack guide mechanism 39 work in conjunction with the rack shaft 31 and the pinion shaft 32 to form the steering gear apparatus 3.

The pinion shaft 32 has a heat-treated surface subjected to heat treatment that increases strength of tooth flanks of the pinion teeth 321. For example, the heat treatment includes quenching and tempering. The heat treatment may cause the central axis of the pinion shaft 32 to be curved like a bow. If the pinion shaft 32 is curved like that, the distance between the central axes (the distance between the centers) of the rack shaft 31 and the pinion shaft 32, i.e., the position of the pinion teeth 321 relative to the rack teeth 311 changes with the rotation of the pinion shaft 32. Thus, in the lateral directions in FIG. 2, when the pinion teeth 321 are displaced in a direction toward the rack shaft 31, the tooth flanks of the pinion teeth 321 are in tight contact with tooth flanks of the rack teeth 311, and when the pinion teeth 321 are displaced in a direction away from the rack shaft 31, the tooth flanks of the pinion teeth 321 are in loose contact with the tooth flanks of the rack teeth 311. As a result, steering torque required to turn the steering wheel 10 so as to move the rack shaft 31 in the axial direction changes periodically with the rotational position of the pinion shaft 32.

Assuming that when the steering wheel 10 is in its neutral position, the pinion teeth 321 mesh with the rack teeth 311 at a rotational position of the pinion shaft 32 that maximizes the steering torque during one rotation of the pinion shaft 32. This causes more drag feel when the steering operation is started from the neutral position. Further, assuming that when the steering wheel 10 is in the neutral position, the pinion teeth 321 mesh with the rack teeth 311 at a rotational position of the pinion shaft 32 (e.g., midway between a rotational portion that maximizes the steering torque and a rotational position that minimizes the steering torque) that causes a large rate of change in steering torque with respect to a change in steering angle. This causes a large difference between the steering torque required to turn the steering wheel 10 to the right from the neutral position and the steering torque required to turn the steering wheel 10 to the left from the neutral position.

In view of the above, according to the embodiment, the rack shaft 31 and the pinion shaft 32 are mounted to the housing 33 such that when the steering wheel 10 is in the neutral position, the pinion teeth 321 mesh with the rack teeth 311 at a rotational position of the pinion shaft 32 that minimizes torque required to move the rack shaft 31 in the axial direction of the rack shaft 31 during one rotation of the pinion shaft 32. In other words, the rotational position of the pinion shaft 32 that minimizes the required torque maximizes the distance from the central axis of the pinion-teeth section 320 of the pinion shaft 32 to the central axis of the rack shaft 31 during one rotation of the pinion shaft 32.

Next, a method of manufacturing the steering gear apparatus 3 by mounting the rack shaft 31 and the pinion shaft 32 in this way is described.

The method of manufacturing the steering gear apparatus 3 includes a detecting process and a mounting process. The detecting process detects a rotational position (hereinafter referred to as a "specific rotational position") of the pinion shaft 32 that minimizes torque required to move the rack shaft 31 in the axial direction of the rack shaft 31 during one rotation of the pinion shaft 32. The mounting process mounts the rack shaft 31 and the pinion shaft 32 to the housing 33 such that when the pinion shaft 32 is in the specific rotational position, the pinion teeth 321 mesh with the rack teeth 311 located in a middle portion of a meshable region of the rack-teeth section 310. The meshable region is where the rack teeth 311 mesh with the pinion teeth 321 when the steering wheel 10 is operated from one of maximum right and left steering angles to the other of the maximum right and left steering angles.

Figure 3A:
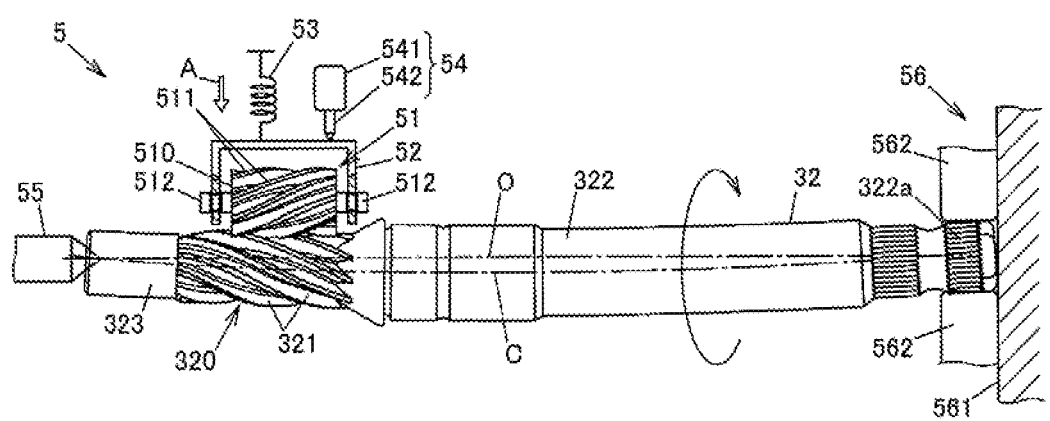
FIGS. 3A, 3B and 3C are diagrams illustrating an example of a detecting process.
Figure 3B:
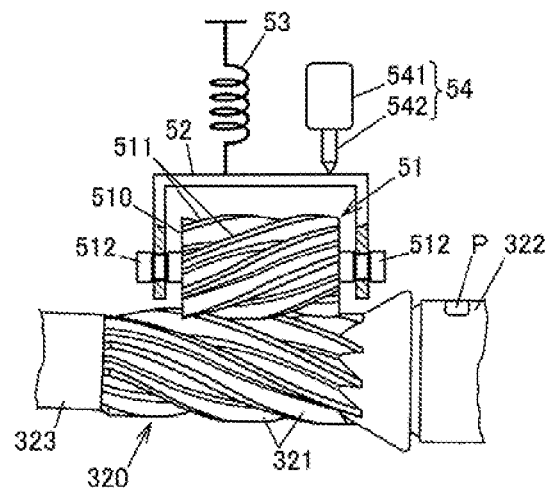
Figure 3C:
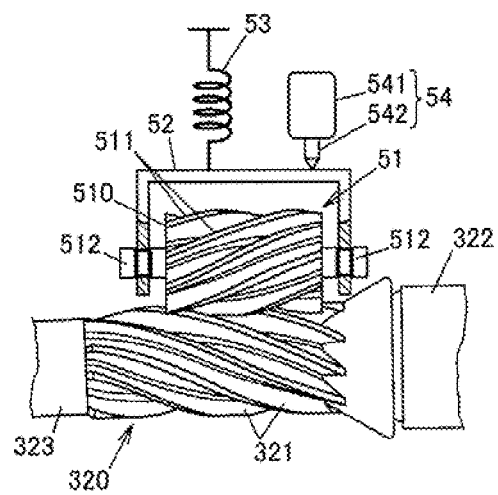

FIGS. 3A, 3B and 3C are diagrams illustrating an example of the detecting process. The detecting process measures the amount of movement of a master gear 51 as a test meshing member while rotating the pinion shaft 32 with the pinion teeth 321 in mesh with gear teeth 511 of the master gear 51, and detects the specific rotational position on the basis of the measured amount of movement of the master gear 51. In the example illustrated in FIGS. 3A, 3B and 3C, the master gear 51 is an external gear and has the same pitch diameter and number of teeth as the pinion-teeth section 320 of the pinion shaft 32. The master gear 51 may differ from the pinion-teeth section 320 in pitch diameter or number of teeth. The detecting process may use, as a test meshing member, a rod-shaped rack shaft, such as having the same specifications as the rack shaft 31.

FIG. 3A illustrates an example structure of a test apparatus 5 including the master gear 51. The test apparatus 5 includes the master gear 51, a supporting member 52, a coil spring 53, a linear gauge 54, a supporting pin 55, and a rotor 56. The master gear 51 is brought into mesh with the pinion-teeth section 320 of the pinion shaft 32. The supporting member 52 rotatably supports the master gear 51. The coil spring 53 is an elastic member and elastically presses the supporting member 52 in a direction toward the pinion-teeth section 320. The linear gauge 54 detects the amount of movement of the supporting member 52 in the radial direction of the pinion shaft 32. The supporting pin 55 supports the boss section 323 of the pinion shaft 32. The rotor 56 rotates the pinion shaft 32 while holding both sides of the serration portion 322a of the pinion shaft 32.

The master gear 51 has a body 510 and a pair of shaft-shaped protrusions 512. The body 510 has an outer peripheral surface provided with the gear teeth 511. Each of the protrusions 512 protrudes from a different side of the body 510 in the axial direction. The supporting member 52 supports the protrusions 512. The master gear 51 and the supporting member 52 are held by a holder (not illustrated) and are slidable together in the radial direction of the pinion shaft 32. The coil spring 53 is elastically compressed in its axis direction to exert a restoring force that presses the supporting member 52 in a direction indicated by an arrow A.

The linear gauge 54 includes a body portion 541 and a stem portion 542 having a tip that abuts with the supporting member 52. The body portion 541 measures the amount of movement of the stem portion 542 relative to the body portion 541 and displays the measured result on a display portion or outputs an electric signal indicative of the measured result to an external device. The supporting pin 55 has a conical tip and supports the boss section 323 by fitting the conical tip into a central hole formed in an end face of the pinion shaft 32. The rotor 56 includes a rotating body 561 and multiple chuck jaws 562. The rotating body 561 is rotated by, for example, an electric motor. The chuck jaws 562 rotate together with the rotating body 561 while holding therebetween the serration portion 322a of the pinion shaft 32. As such, the test apparatus 5 rotates the pinion shaft 32 by supporting both ends of the pinion shaft 32 with the supporting pin 55 and the rotor 56.

The pinion shaft 32 has a central axis C. When rotating by the rotational force of the rotor 56, the pinion shaft 32 rotates on a rotation axis O. In FIG. 3A, the central axis C and the rotation axis O are indicated by separate long dashed short dashed lines. As illustrated in FIG. 3A, the central axis C of the pinion shaft 32 is curved like a bow by stress due to heat treatment. In FIG. 3A, the curve of the pinion shaft 32 is exaggerated for the purpose of explanation. Due to the curve of the pinion shaft 32, when the pinion shaft 32 rotates, the master gear 51 rotates while reciprocating together with the supporting member 52 in the radial direction of the pinion shaft 32.

FIG. 3B illustrates a state after the master gear 51 and the supporting member 52 are fully moved in a direction toward the rotation axis O (downward in the drawing). FIG. 3C illustrates a state after the master gear 51 and the supporting member 52 are fully moved in a direction away from the rotation axis O (upward in the drawing). The transition between the state illustrated in FIG. 3B and the state illustrated in FIG. 3C changes the rotational position of the pinion shaft 32 by 180 degrees. During the half rotation of the pinion shaft 32, the master gear 51 and the supporting member 52 move together in a direction perpendicular to the rotation axis O.

In the detecting process, the pinion shaft 32 is rotated by 360 degrees or more, and a rotational position of the pinion shaft 32 at which the master gear 51 and the supporting member 52 are closest to the rotation axis O during the rotation of the pinion shaft 32 is detected as the specific rotational position. The specific rotational position is marked on the pinion shaft 32 such that the specific rotational position is visually detectable by an operator. Marking the specific rotational position may be manually performed by an operator or automatically performed by the test apparatus 5, for example, on the basis of the result detected by the linear gauge 54. The test apparatus 5 stops the rotation of the pinion shaft 32, for example, at such a phase that the specific rotational position reaches a predetermined position in the rotational direction of the pinion shaft 32. Then, a mark indicating the specific rotational position is placed on the pinion shaft 32 that is stopped. The mark may be formed by painting, carving, or any other suitable method. Alternatively, the mark may be a C-shaped detachable ring made of resin or a sticker with an adhesive layer. In the example of FIG. 3B, a painting material P is applied as the mark.

Figure 4A:
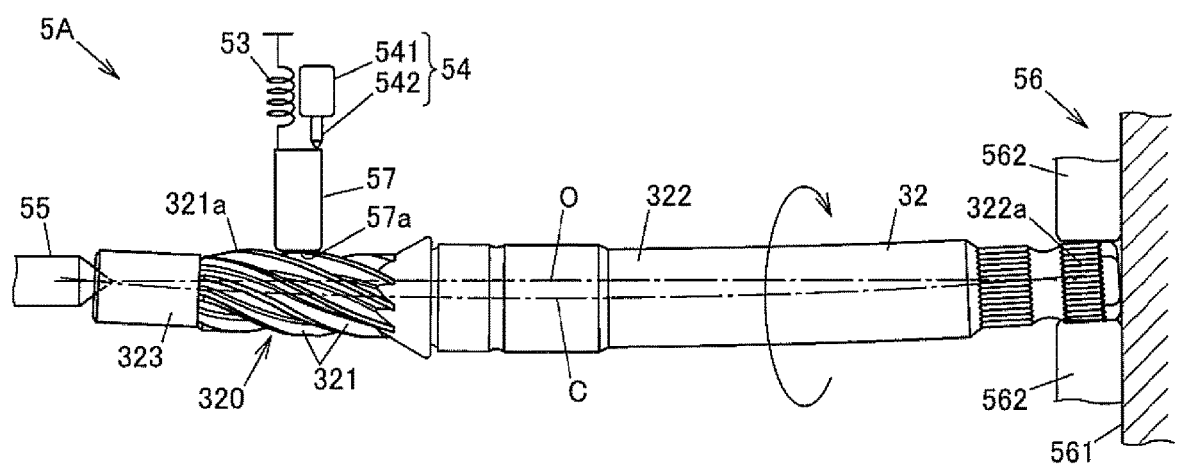
FIGS. 4A and 4B are diagrams illustrating a modification of the detecting process.
Figure 4B:
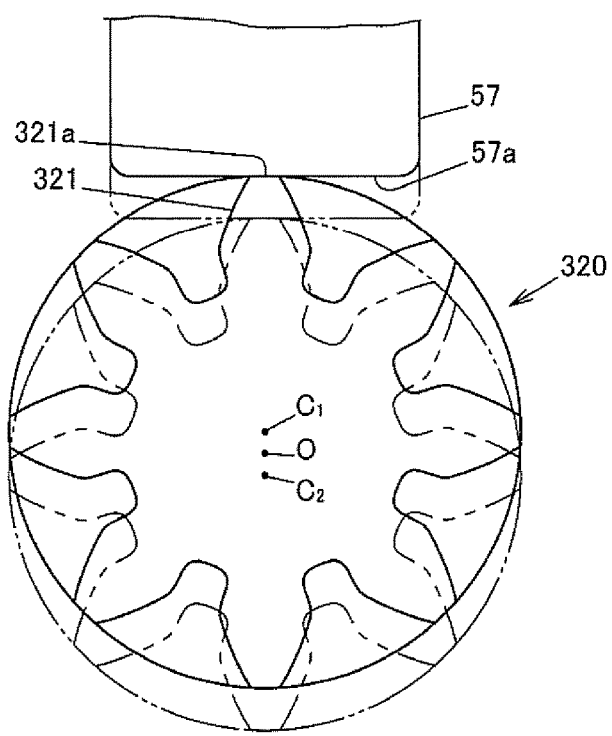

FIG. 4A is a diagram illustrating a test apparatus 5A according to a modification of the test apparatus 5. In FIGS. 4A and 4B, the structures common to the test apparatus 5 illustrated in FIGS. 3A, 3B, and 3C are denoted by the same reference symbols as those used for the test apparatus 5, and the already described features of the common structures are not described again. The test apparatus 5A includes an abutment member 57, instead of the master gear 51 and the supporting member 52 of the test apparatus 5. The abutment member 57 has a flat abutment surface 57a that abuts with top lands 321a of the pinion teeth 321. The abutment member 57 is held by a holder (not illustrated) and is slidable in a direction that is perpendicular to the rotation axis O. The abutment member 57 is pressed by the coil spring 53 against the pinion shaft 32. The amount of movement of the abutment member 57 in the sliding direction is detected by the linear gauge 54.

FIG. 4B is a partial view illustrating the pinion-teeth section 320 of the pinion shaft 32 and the abutment member 57 when viewed in a direction along the rotation axis O. As illustrated in FIG. 4B, the pinion-teeth section 320 has eight pinion teeth 321. Since the pinion shaft 32 is curved, each of the top lands 321a of the pinion teeth 321 comes in contact with the abutment surface 57a of the abutment member 57 at a different distance from the rotation axis O.

In FIG. 4B, a continuous line represents a state where the top land 321a of the pinion teeth 321 is in contact with the abutment surface 57a of the abutment member 57 at a location furthest from the rotation axis O. A hidden outline (a long dashed double-short dashed line) represents a state where the top land 321a of the pinion teeth 321 is in contact with the abutment surface 57a of the abutment member 57 at a location closest to the rotation axis O. In FIG. 4B, a reference sign "$C_1$" denotes the central axis of the pinion shaft 32 in the state represented by the continuous line, and a reference sign "$C_2$" denotes the central axis of the pinion shaft 32 in the state represented by the hidden outline. As illustrated in FIG. 4B, the abutment member 57 reciprocates, with the rotation of the pinion shaft 32, in the radial direction of the pinion shaft 32 that is perpendicular to the rotation axis O.

In the detecting process that uses the test apparatus 5A, eight rotational positions of the pinion shaft 32 where the respective top lands 321a of the eight pinion teeth 321 come in contact with the abutment surface 57a of the abutment member 57 are measured. Out of the measured eight rotational positions of the pinion shaft 32, one rotational position where the abutment member 57 comes in abutment with the top land 321a of any one of the pinion teeth 321 at a location closest to the rotation axis O is detected as the specific rotational position. The specific rotational position is marked on the pinion shaft 32 such that the specific rotational position is visually detectable by an operator. As such, this detecting process measures a displacement (i.e., a change in position) of the top land 321a of the pinion teeth 321 while rotating the pinion shaft 32, and detects the specific rotational position on the basis of the measured displacement.

The detecting process may be further modified such that the position of the top land 321a is contactlessly measured during the rotation of the pinion shaft 32, for example, by using a laser distance meter. In this modification, for example, the linear gauge 54 illustrated in FIG. 4A is replaced with a laser distance meter, and a distance between the top land 321a and the laser distance meter is measured during the rotation of the pinion shaft 32 on the basis of reflection of a laser beam from the top land 321a. As such, this modification measures the displacement of the top land 321a of the pinion teeth 321 while rotating the pinion shaft 32, and detects the specific rotational position on the basis of the measured displacement.

Figure 5A:
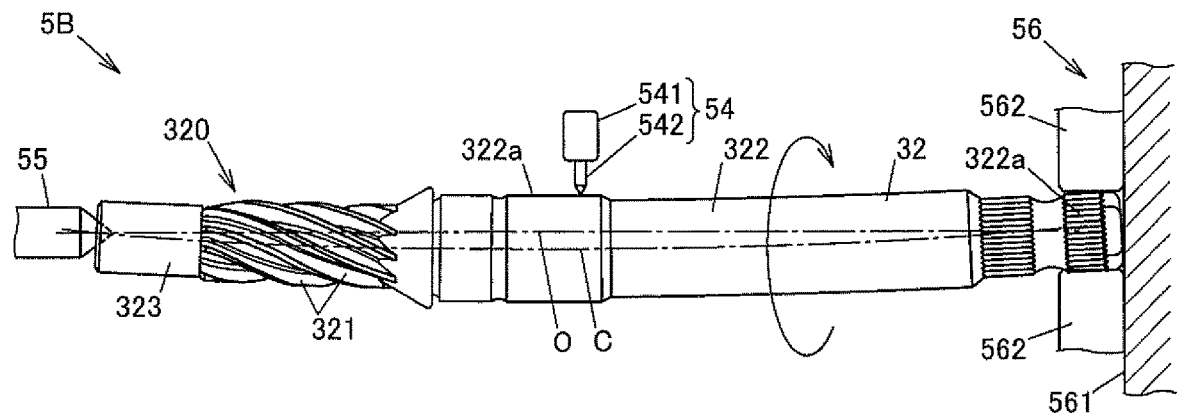
FIGS. 5A and 5B are diagrams illustrating another modification of the detecting process.

FIG. 5A is a diagram illustrating a test apparatus 5B according to another modification. The test apparatus 5B measures a displacement of the outer peripheral surface 322b of the shank section 322 while rotating the pinion shaft 32, and detects the specific rotational position on the basis of the measured displacement. The test apparatus 5B includes the linear gauge 54 and measures the displacement of the outer peripheral surface 322b of the shank section 322 while rotating the pinion shaft 32 with the tip of the stem portion 542 in abutment with the outer peripheral surface 322b of the shank section 322. It is preferable that the stem portion 542 of the linear gauge 54 be in abutment with the outer peripheral surface 322b of the shank section 322 at a middle of the pinion shaft 32 in the longitudinal direction of the pinion shaft 32. This is because the magnitude of displacement of the outer peripheral surface 322b of the shank section 322 is greatest at the middle of the pinion shaft 32.

Figure 5B:
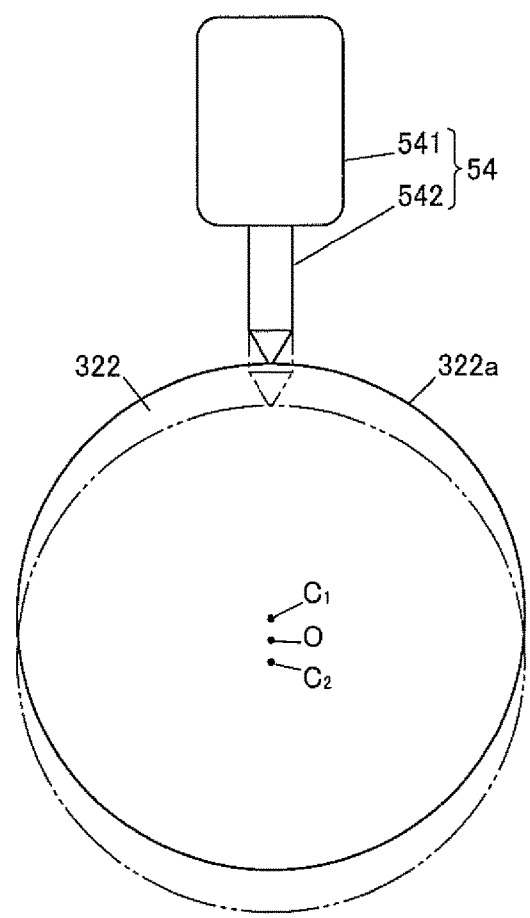

FIG. 5B is a diagram, when viewed in a direction along the rotation axis O, illustrating a portion of the shank section 322 in abutment with the stem portion 542 of the linear gauge 54. Since the pinion shaft 32 is curved, the position of the outer peripheral surface 322b of the shank section 322 relative to the rotation axis O changes with the rotation of the pinion shaft 32.

In FIG. 5B, a continuous line represents a state where the outer peripheral surface 322b of the shank section 322 is in contact with the stem portion 542 of the linear gauge 54 at a location furthest from the rotation axis O. A hidden outline (a long dashed double-short dashed line) represents a state where the outer peripheral surface 322b of the shank section 322 is in contact with the stem portion 542 of the linear gauge 54 at a location closest to the rotation axis O. In FIG. 5B, a reference sign "$C_1$" denotes the central axis of the pinion shaft 32 in the state represented by the continuous line, and a reference sign "$C_2$" denotes the central axis of the pinion shaft 32 in the state represented by the hidden outline.

In the detecting process that uses the test apparatus 5B, a rotational position of the pinion shaft 32 that maximizes the amount of protrusion of the stem portion 542 of the linear gauge 54 from the body portion 541 is detected as the specific rotational position. The specific rotational position is marked on the pinion shaft 32 such that the specific rotational position is visually detectable by an operator. The test apparatus 5B may use a laser distance meter instead of the linear gauge 54. In this case, a laser beam as measurement light is emitted perpendicularly to the rotation axis O toward the outer peripheral surface 322b of the shank section 322, and a rotational position of the pinion shaft 32 that maximizes the distance between the laser distance meter and the outer peripheral surface 322b of the shank section 322 is detected as the specific rotational position.

Figure 6:
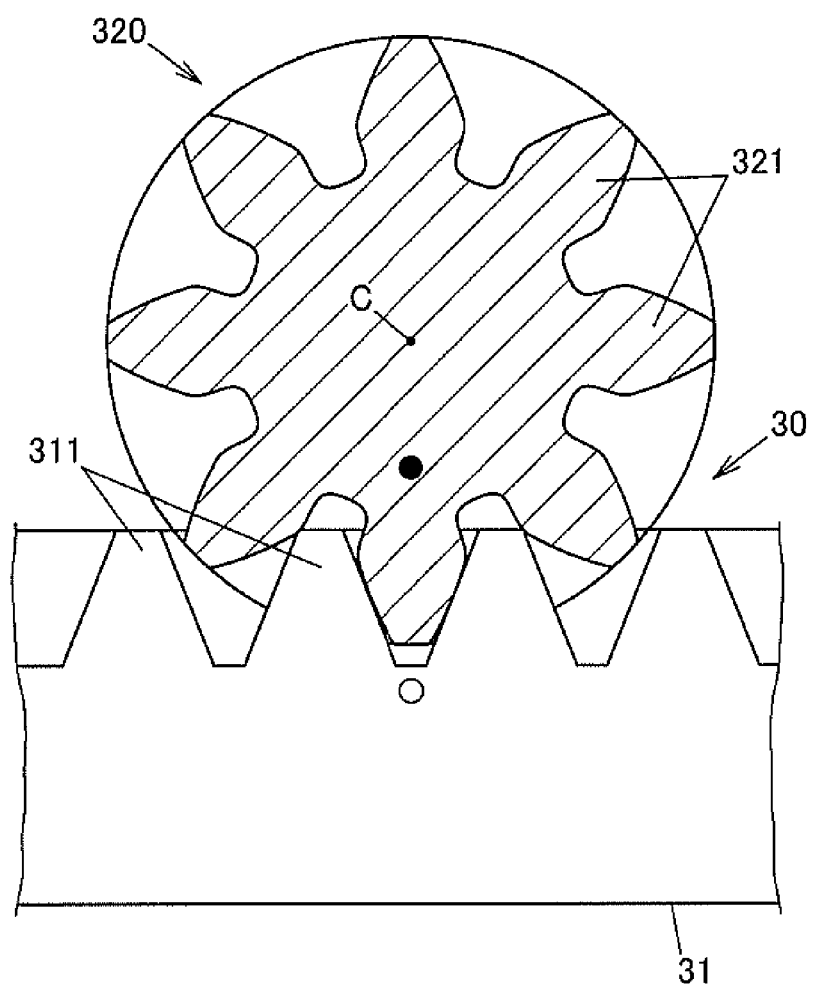
FIG. 6 is a diagram illustrating a meshing area between rack teeth and pinion teeth.

FIG. 6 is a diagram illustrating the meshing area 30 between the rack teeth 311 and the pinion teeth 321 that are in mesh with each other within the housing 33. In FIG. 6, a black circle represents the specific rotational position of the pinion shaft 32. In FIG. 6, a white circle represents the middle portion of the meshable region of the rack-teeth section 310 in the axial direction of the rack shaft 31. As already described, the meshable region is where the rack teeth 311 mesh with the pinion teeth 321 when the steering wheel 10 is operated from one of the maximum right and left steering angles to the other of the maximum right and left steering angles. When the steering wheel 10 is in the neutral position, the pinion-teeth section 320 meshes with the middle portion of the rack-teeth section 310 represented by the white circle. In the mounting process following the detecting process, the rack shaft 31 and the pinion shaft 32 are mounted to the housing 33 such that when the pinion shaft 32 is in the specific rotational position, the pinion teeth 321 mesh with the rack teeth 311 located in the middle portion.

Figure 7:
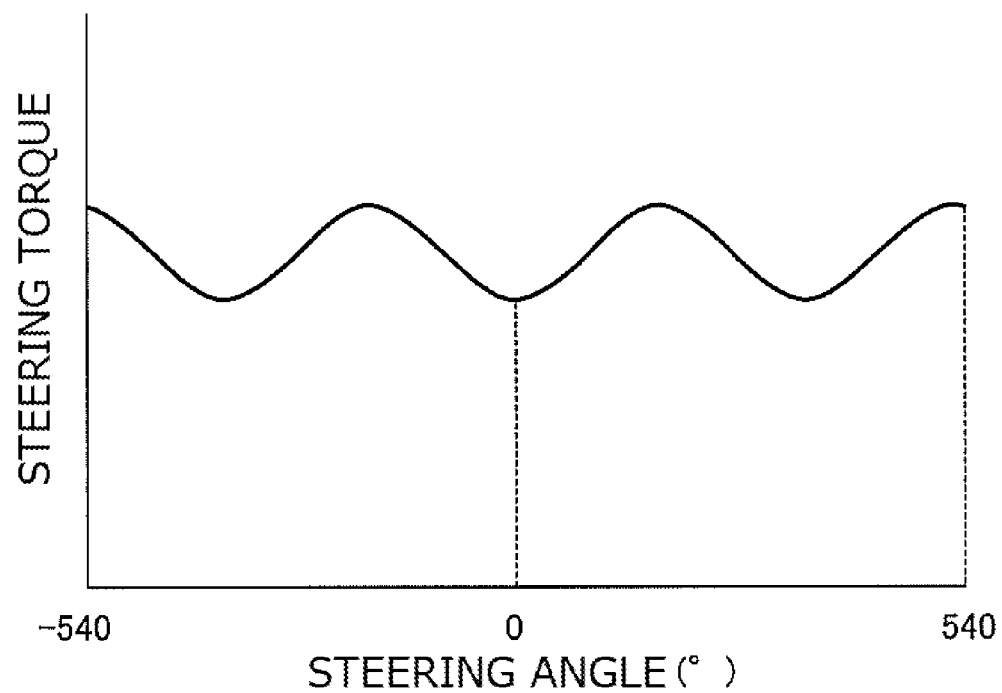
FIG. 7 is a graph illustrating an example of a relationship between a steering angle and a steering torque according to the embodiment.

FIG. 7 is a graph illustrating a relationship between the steering angle (the rotational position of the pinion shaft 32) and the steering torque in the steering gear apparatus 3 assembled in the manner described above, when the pinion shaft 32 is rotated until the rack shaft 31 is moved in the axial direction to rack end positions corresponding to the right and left maximum steering angles of the steering wheel 10. The steering angle of zero degrees (0°) corresponds to the neutral position of the steering wheel 10. The steering torque in the graph is measured with the electric power steering system 1 as a single unit where the rack shaft 31 is separated from the ball joint sockets 11 and the tie rods 12. The steering torque represented by the vertical axis in FIG. 7 is the torque required to move the rack shaft 31 in the axial direction of the rack shaft 31 by rotating the pinion shaft 32.

As illustrated in FIG. 7, when the pinion shaft 32 is curved, the steering torque changes like a sine wave with a period of 360 degrees corresponding to one rotation of the pinion shaft 32. The torque required to move the rack shaft 31 in the axial direction of the rack shaft 31 by the steering operation of the steering wheel 10 has a minimum value at the valley of the wave. The specific rotational position detected in the detecting process is a rotational position of the pinion shaft 32 corresponding to the valley of the wave. In short, when the steering angle is zero degrees, the steering torque has a minimum value corresponding to the valley of the wave during one period of the steering torque.

As described above, according to the embodiment, the steering torque required to start the steering operation when the steering wheel 10 is in the neutral position is close to the minimum value corresponding to the valley of the wave during one period. This reduces a drag feel that is caused when the steering operation is started from the neutral position, thus achieving a better steering feel.

Figure 8A:
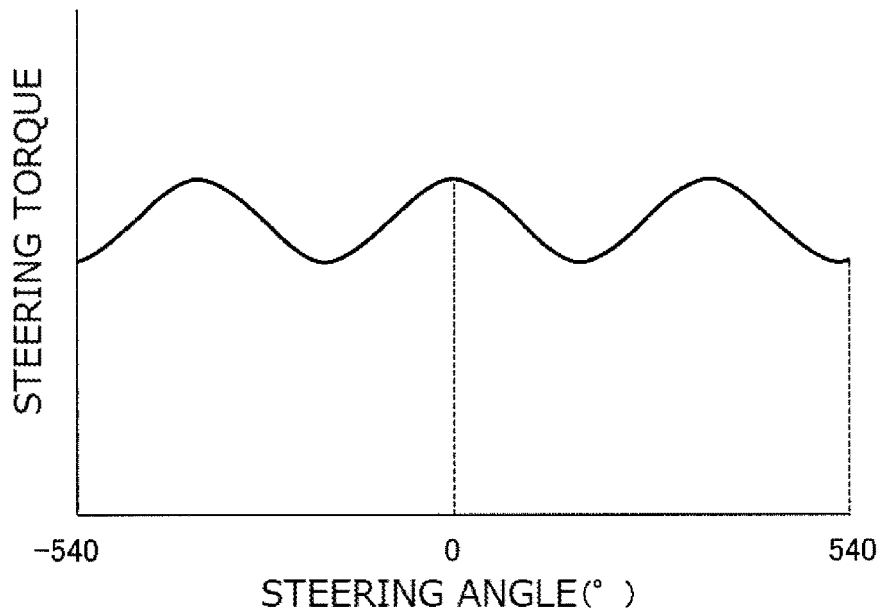
FIGS. 8A and 8B are graphs illustrating relationships between a steering angle and a steering torque according to comparison examples.
Figure 8B:
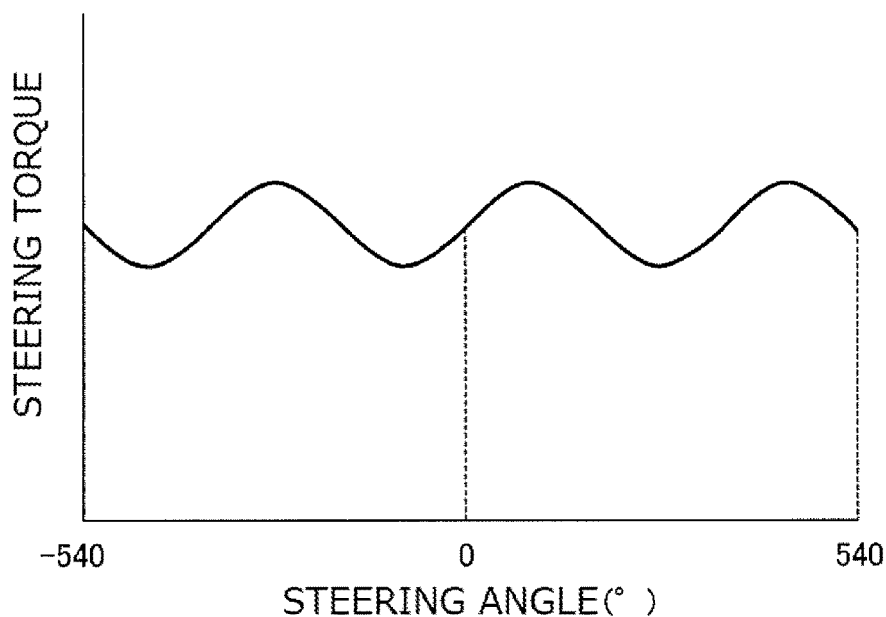

FIGS. 8A and 8B are graphs illustrating relationships between a steering angle and a steering torque according to comparison examples. FIG. 8A illustrates measurement results obtained in the following structure: when the steering wheel 10 is in the neutral position, the pinion teeth 321 mesh with the rack teeth 311 at a rotational position of the pinion shaft 32 that maximizes the steering torque during one rotation of the pinion shaft 32. FIG. 8B illustrates measurement results obtained in the following structure: when the steering wheel 10 is in the neutral position, the pinion teeth 321 mesh with the rack teeth 311 at a rotational position of the pinion shaft 32 that is midway between a rotational position that maximizes the steering torque during one rotation of the pinion shaft 32 and a rotational position that minimizes the steering torque during one rotation of the pinion shaft 32.

If the steering angle and steering torque have such a relationship as illustrated in FIG. 8A, more drag feel is caused when the steering operation is started from the neutral position of the steering wheel 10. On the other hand, if the steering angle and steering torque have such a relationship as illustrated in FIG. 8B, a large difference occurs between the steering torque required to operate the steering wheel 10 from the neutral position to the right and the steering torque required to operate the steering wheel 10 from the neutral position to the left. Thus, the steering torque differs between when the steering wheel 10 is operated from the neutral position to the right and when the steering wheel 10 is operated from the neutral position to the left. Either case degrades a steering feel.

As described above, according to the embodiment, when the steering wheel 10 is in the neutral position, the pinion teeth 321 mesh with the rack teeth 311 at the specific rotational position of the pinion shaft 32 that minimizes the steering torque during one rotation of the pinion shaft 32. This reduces a drag feel that is caused when the steering operation is started from the neutral position, thus improving a steering feel. Further, this does not necessitate finishing the pinion teeth 321 by skiving or the like, after heat treatment of the pinion shaft 32. Furthermore, this does not increase the number of components, unlike the related art disclosed in JP 2012-81867 A and JP 2012-126335 A, thus curbing an increase in manufacturing cost. As such, the steering gear apparatus 3 and the method of manufacturing the steering gear apparatus 3 according to the embodiment makes it possible to reduce a drag feel at the start of steering operation and thus to improve a steering feel, while curbing an increase in manufacturing cost.

While the invention has been described with reference to a specific embodiment, it is to be understood that the invention is not limited to the embodiment. It is not essential that all the features described in the embodiment be combined to carry out the invention.

The embodiment may be modified in various ways within the scope of the invention. The embodiment illustrates that the electric power steering system 1 is a column assist type that applies a steering assist force to the column shaft 21. Alternatively, the electric power steering system 1 may be a pinion assist type that applies a steering assist force to the pinion shaft 32. Further, the invention is applicable to power steering systems that applies a hydraulic steering assist force to the rack shaft 31 and also applicable to steering systems without a steering assist device.

A rack-and-pinion steering apparatus and a method of manufacturing the rack-and-pinion steering apparatus according to the invention make it possible to reduce a drag feel at the start of steering operation and thus to improve a steering feel, while curbing an increase in manufacturing cost.

What is claimed is:

1. A rack-and-pinion steering apparatus comprising:
   a rack shaft having a plurality of rack teeth, the rack shaft being configured to move in an axial direction to steer steered wheels of a vehicle;
   a pinion shaft having a plurality of pinion teeth, the pinion shaft being configured to rotate in accordance with a steering operation of a steering wheel, the pinion shaft having a curved shape with a curved central axis, and the pinion shaft has a pinion-teeth section including the plurality of pinion teeth; and
   a housing supporting the rack shaft and the pinion shaft, the housing encompassing a meshing area between the plurality of rack teeth and the plurality of pinion teeth, wherein:
      when the steering wheel is in a neutral position, the plurality of pinion teeth mesh with the plurality of rack teeth at a rotational position of the pinion shaft, the rotational position minimizing torque required to move the rack shaft in the axial direction during one rotation of the pinion shaft, and
      the rotational position maximizes a distance from the central axis of the pinion-teeth section of the pinion shaft to the rack shaft during the one rotation of the pinion shaft.

2. The rack-and-pinion steering apparatus according to claim 1, wherein the pinion shaft has a heat-treated surface that is treated by having been subjected to heat treatment causing the central axis of the pinion shaft to be curved.

3. A method of manufacturing the rack-and-pinion steering apparatus according to claim 1, the method comprising:
   detecting a rotational position of the pinion shaft that minimizes torque required to move the rack shaft in the axial direction during one rotation of the pinion shaft; and
   mounting the rack shaft and the pinion shaft to the housing such that when the pinion shaft is in the rotational position, the plurality of pinion teeth mesh with the plurality of rack teeth located in a middle portion of a meshable region of a rack-teeth section of the rack shaft, wherein:
      the rack-teeth section is provided with the plurality of rack teeth, and
      the meshable region is located where the plurality of rack teeth mesh with the plurality of pinion teeth when the steering wheel is operated from one of (i) a maximum right steering angle to a maximum left steering angle, or (ii) the maximum left steering angle to the maximum right steering angle.

4. A method of manufacturing the rack-and-pinion steering apparatus according to claim 2, the method comprising:
   detecting a rotational position of the pinion shaft that minimizes torque required to move the rack shaft in the axial direction during one rotation of the pinion shaft; and
   mounting the rack shaft and the pinion shaft to the housing such that when the pinion shaft is in the rotational position, the plurality of pinion teeth mesh with the plurality of rack teeth located in a middle portion of a meshable region of a rack-teeth section of the rack shaft, wherein:
      the rack-teeth section is provided with the plurality of rack teeth, and
      the meshable region is located where the plurality of rack teeth mesh with the plurality of pinion teeth when the steering wheel is operated from one of (i) a maximum right steering angle to a maximum left steering angle, or (ii) the maximum left steering angle to the maximum right steering angle.

5. The method according to claim 3, wherein the detecting including:
   measuring an amount of movement of a test meshing member while rotating the pinion shaft with the plurality of pinion teeth in mesh with gear teeth of the test meshing member, and
   detecting the rotational position based on the measured amount of movement.

6. The method according to claim 3, wherein the detecting includes:
   measuring a displacement of a top land of the plurality of pinion teeth while rotating the pinion shaft, and
   detecting the rotational position based on the measured displacement.

7. The method according to claim 3, wherein:
   the pinion shaft has a first end and a second end opposite to the first end in an axial direction of the pinion shaft, a pinion-teeth section provided with the plurality of pinion teeth and located closer to the first end than to the second end, and a cylindrical shank section located between the pinion-teeth section and the second end, and
   the detecting includes:
      measuring a displacement of an outer peripheral surface of the cylindrical shank section while rotating the pinion shaft with the first end and second end being supported, and
      detecting the rotational position based on the measured displacement.

* * * * *